Figure 1:
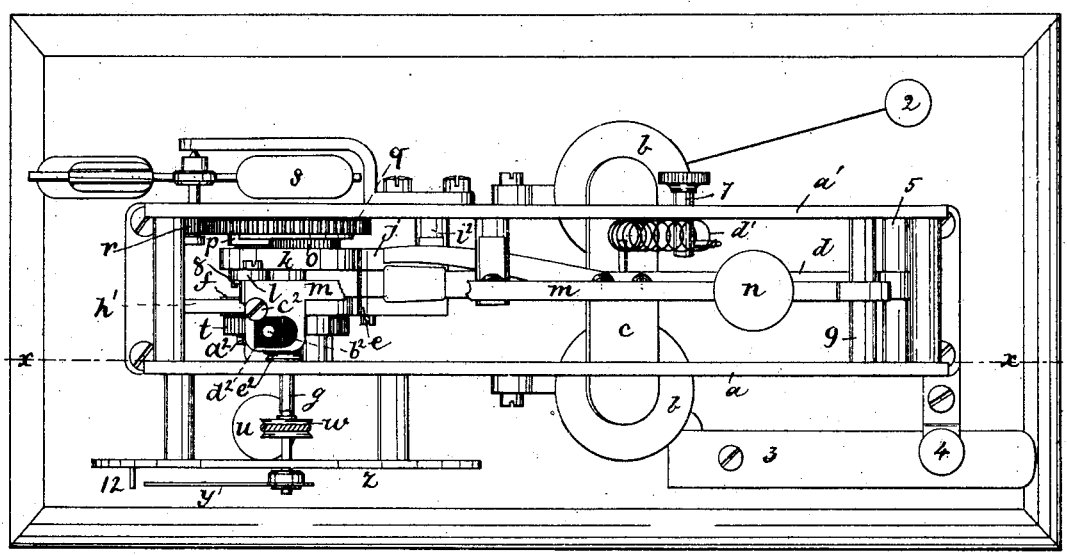

(Model.)

F. CHENEY, Jr. & S. H. ROPER.
TELEPHONE SIGNAL APPARATUS.

No. 244,111. Patented July 12, 1881.

2 Sheets—Sheet 1.

WITNESSES
Jos. P. Livermore
A. Reynolds

INVENTORS
Frank Cheney Jr. and
Sylvester H. Roper.
by Crosby & Gregory Attys

N. PETERS, Photo-Lithographer, Washington, D. C.

(Model.) 2 Sheets—Sheet 2.
F. CHENEY, Jr. & S. H. ROPER.
TELEPHONE SIGNAL APPARATUS.
No. 244,111. Patented July 12, 1881.
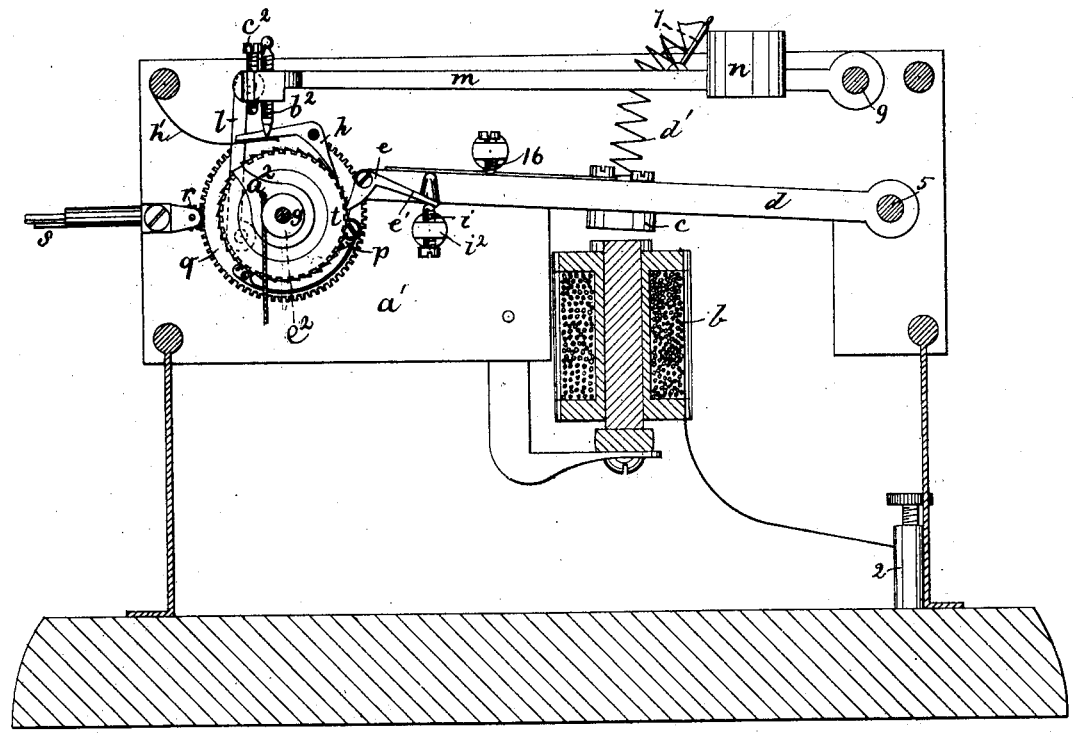
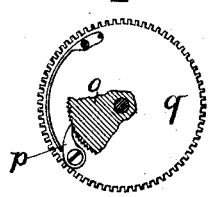
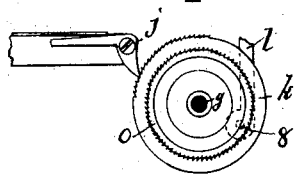
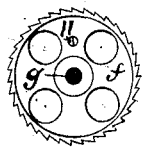
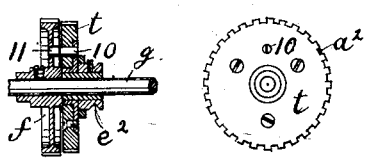
WITNESSES— 
Jos. P. Livermore 
A. Reynolds
INVENTORS— 
Frank Cheney Jr and 
Sylvester H. Roper. 
by Crosby & Gregory Attys

UNITED STATES PATENT OFFICE.

FRANK CHENEY, JR., OF SOUTH MANCHESTER, CONNECTICUT, AND SYL-VESTER H. ROPER, OF BOSTON, MASSACHUSETTS.

TELEPHONE SIGNAL APPARATUS.

SPECIFICATION forming part of Letters Patent No. 244,111, dated July 12, 1881.

Application filed May 31, 1880. (Model.)

*To all whom it may concern:*

Be it known that we, FRANK CHENEY, Jr., of South Manchester, county of Hartford, State of Connecticut, and SYLVESTER H. ROPER, of Boston, county of Suffolk, State of Massachusetts, have invented an Improvement in Telephone Signal Apparatus, of which the following description, in connection with the accompanying drawings, is a specification.

Our invention relates to a signal apparatus for use in telephone-exchange systems and for other similar purposes, and is of that class known as individual signals, in which, of several signaling-instruments operated in the same circuit by the same electric currents, one only gives an audible signal at one time. This result has been accomplished in a variety of ways, most of which may be brought under three or four general classes, the most important of which are, first, those in which currents of different character are used, each instrument in the circuit responding to or sounding under the influence of one of the said currents and not being affected by the others, each of which operates the corresponding signaling-instrument. In another variety the signals are controlled mechanically, each being allowed to operate at a certain time and at other times kept silent, the time for sounding of each one being different from that of all the others. In another variety a signal-controlling mechanism in the signal-instrument is operated by a series of electrical impulses or currents, so as to place after a certain number of such impulses, different for each instrument in the circuit, the said mechanism in position to allow or cause a signal to be sounded, the controlling mechanism of the instrument that is to be sounded after the number of impulses that has been given being brought by those impulses into position either to close a local circuit by which a signal is sounded or to allow a bell-hammer to move, which is locked when the said controlling mechanism is in its other positions. When the signal is of this latter class, being allowed to sound by the release of the bell-hammer, and the bell is rung by an electric current in the same circuit that is employed to set the controlling mechanism, the character of the current for performing one operation—as ringing the bell—should be such as will have no effect upon the mechanism for performing the other operation or setting the instrument in position to give a signal.

In the signal apparatus of this class as heretofore generally constructed the instruments, after a signal has been given in any one of them, have been set back to a common starting-point by a current of different character from those used to set the controlling devices in position to allow one of the signals to sound, the said apparatus thus requiring currents of two or three different characters to properly operate them.

Our invention, which is embodied in this general class of signaling-instruments, enables the signals to be given with currents of but one character in the main circuit, the said signals being, as herein shown, operated by merely breaking the circuit of a common battery or other electric generator the proper number of times by a common finger-key, which may be placed at any point in the circuit. These keys being placed at each instrument, an operator at any instrument can cause the signal to be sounded at any other one.

The invention consists, first, in the combination, with a signal-controlling mechanism or device to be operated by changes in the electric current, as by breaking and closing the circuit, of a governor so arranged as to allow the signal-controlling devices of all the instruments to move forward together at each momentary change of the circuit or interruption of the current, the said device of each instrument arriving in its turn in position to permit a signal to be given, and then, when the desired one of the instruments is in such position and the operator ceases breaking the circuit, to set all the instruments back to a unison-point. The instrument that has been properly set remains in the proper condition to give a signal, but comes into unison with the others on the next movement of the controlling device, which takes place either when the next signal is given or, as herein shown, when the operator at the said station receives the signal and operates his key to stop the sounding thereof.

As herein shown, the signal is given by closing a local circuit, one electrode of which is carried by a wheel or disk on a shaft provided with a ratchet-wheel, which is operated by a pawl actuated by an electro-magnet to give a step-by-step movement at each charging of the said magnet in the usual manner. A retaining-pawl prevents backward movement of the said ratchet-wheel during the operation of the actuating-pawl.

The governor acts upon the retaining-pawl at the proper time to release the ratchet-wheel and allow it to return to its starting-point in unison with the other instruments, the said governor being shown as a weighted arm, which is raised by a pawl actuated by the armature of the electro-magnet each time it is attracted, the said arm being engaged and held in its elevated position by the said pawl except when the armature is held to the poles of the magnet, at which time the said pawl is disengaged and the arm permitted to fall. The said governor-arm in falling is retarded by a fly or other equivalent device, causing it to occupy a certain interval of time in its descent before it reaches and trips the retaining-pawl of the step-by-step ratchet-wheel.

The magnet is shown in a normally-closed circuit, the key used breaking the circuit when depressed; and the operator, desiring to give a signal, depresses the key the proper number of times without at any time leaving the key closed for a sufficient interval to allow the governor-arms of the different instruments to fall, thus preventing the release of the retaining-pawls and causing the signal-controlling mechanism to advance step by step until the electrode of the local circuit of the instrument it is desired to have signaled is brought to the proper position, when the key is left closed, and, the armature being attracted, the pawl which raised the governor-arm is disengaged, so that the said governor-arm now falls and releases the retaining-pawl, allowing the ratchet-wheel in each instrument to return to its starting-point. The other electrode of the local circuit is carried by the said governor-arm, and is brought in the descent thereof into connection with the electrode carried by the step-by-step movement of the instrument that it is desired to signal, the corresponding electrodes in the other instruments being so placed as to be out of range of the falling ones, after the number of movements used to set the one in question.

Figure 2:
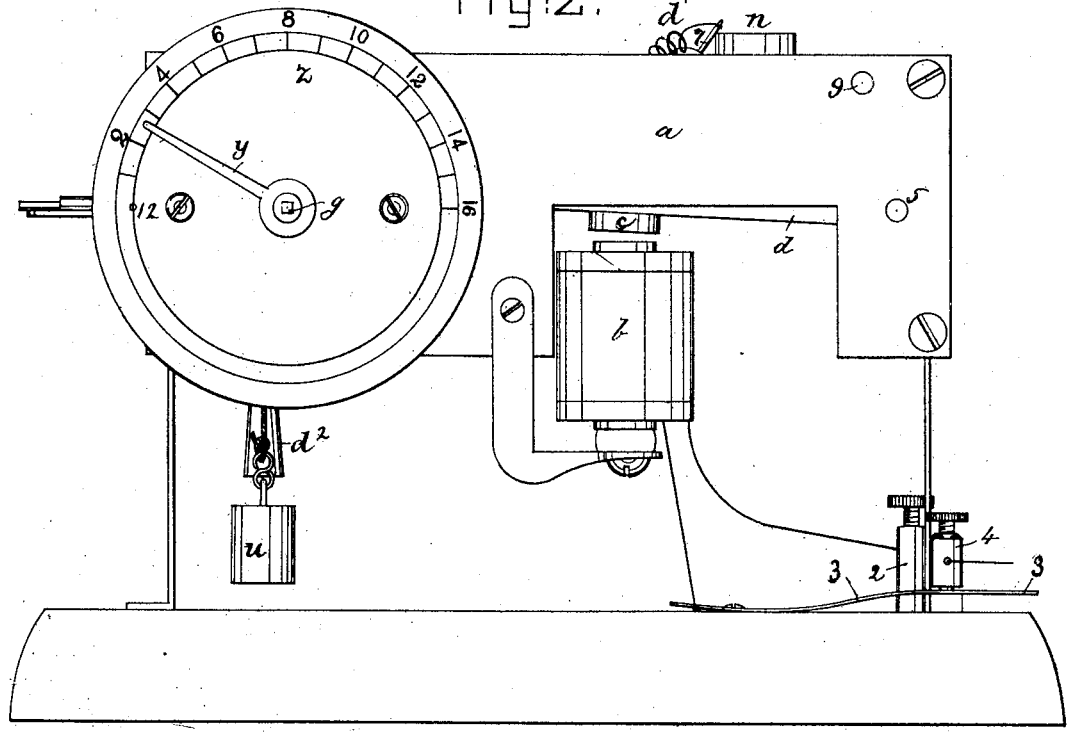

Figure 1 is a plan view of a signal-instrument embodying our invention; Fig. 2, a side elevation thereof; Fig. 3, a longitudinal section thereof on line $x$ $x$, Fig. 1; Fig. 4, a detail showing the main shaft and the parts connected therewith, and Figs. 5, 6, 7, 8, 9, and 10, details to be referred to.

The frame-work consists, mainly, of two plates, $a$ $a'$, upon and between which the working parts are supported.

The actuating electro-magnet $b$ has one electrode connected with the binding-screw 2, and the other with the key 3, which is normally in connection with the binding-screw 4 when not depressed to break the main circuit which is connected with the screws 2 4.

The armature $c$ of the magnet $b$ is carried on a lever, $d$, pivoted at 5 in the frame $a$ $a'$, and provided at its other end with an actuating-pawl, $e$, to operate the signal-controlling mechanism having a projecting arm, $e'$, the weight whereof throws the said pawl into engagement with the ratchet-wheel $f$ fast on the shaft $g$. When the circuit is broken the magnet $b$ releases the armature $c$, and the arm $d$ is raised by the retracting-spring $d'$ adjusted by the pin 7, the pawl $e$ then passing over a tooth of the ratchet-wheel $f$, and when the circuit is again closed and the armature attracted the pawl $e$ moves the wheel $f$ for the space of one tooth where it is held by the retaining-pawl $h$ pressed into engagement therewith by the spring $h'$, the pawl $e$ being thrown out of engagement at the end of its downward movement by the adjustable stop or pin $i$ supported on the arm $i^2$ upon the frame $a'$ engaging the arm $e'$ thereof.

In the operation above described a second pawl, $j$, on the arm $d$, having as its function to operate the "governing mechanism," so-called, since it governs the signal-controlling mechanism, engages a toothed disk, $k$, loose on the shaft $g$, (see Fig. 6,) and rotates it for a short distance, this pawl, also, like the one $e$ being disengaged from one disk, $k$, at the end of its movement by the similar adjustable pin $i'$ on the arm $i^2$. The said disk is provided with a wrist-pin connected, by a link, $l$, with the end of the governor-arm $m$, pivoted at 9 to the frame $a$ $a'$, and provided with a weight, $n$, which may be slipped along on the said arm to any desired distance from the fulcrum 9 to adjust the force required to raise the said arm, and consequently that with which it descends. The disk $k$ is also provided with a ratchet-wheel, $o$, engaged by a pawl, $p$, on a gear, $q$, loose on the shaft $g$, and meshing with a pinion, $r$, on a spindle carrying a fly or revolving fan, $s$.

When the arm $d$ vibrates under the influence of the magnet $b$ to revolve the wheel $f$ and shaft $g$, as before described, the pawl $j$ also rotates the disk $k$, causing it through the link $l$ to raise the governor-arm $m$, and in such rotation the ratchet-wheel $o$ slips by the pawl $p$ without rotating and being retarded by the gear $q$ and fly $s$. When the arm $d$ reaches its lowest position the pawl $j$ is thrown out of engagement with the teeth of the disk $k$ by the pin $i$, as described, to thus allow the said disk to be rotated back under the influence of the weighted arm $m$ in falling; but in such backward rotation the ratchet $o$ is engaged by the pawl $p$, thus necessitating the revolution of the fly $s$ which retards the descent of the said arm, so that if the arm $d$ is directly again vibrated, the said arm will not have time to descend, but will be still farther elevated by the action of the pawl $j$ on the disk $k$.

The disk $k$ is provided with teeth only on a portion of its circumference, so that it is only rotated for a short distance by the repeated vibrations of the pawl $j$, the said pawl reaching and moving over the smooth part of the said disk, without turning it, before the latter has brought the pin 8 above the shaft $g$, or on a dead-center.

By the side of the ratchet-wheel $f$ is placed the signal-controlling disk $t$ on the shaft $g$ (see Fig. 8) loose, and made at its periphery of insulating material, and provided with a pin, 10, projecting from its side, in position to be engaged by a pin, 11, on the wheel $f$, (see Figs. 7 and 8,) so arranged that when the wheel $f$ is moved forward in its step-by-step movement the pin 11 engages the pin 10, causing the disk $t$ to accompany the wheel $f$; but when the wheel $f$ is moved backward the pin 11 can recede from the pin 10, allowing the said wheel to move backward unaccompanied by the disk $t$. The disk $t$ is provided with notches in its periphery corresponding in position to the teeth of the wheel $f$.

The shaft $g$ has a retractor tending to make it move backward in an opposite direction to that imparted by the pawl $e$, the said retractor being shown as a weight, $u$, suspended from a pulley, $w$, on the said shaft, which is also provided with a pointer, $y$, to move with the said shaft over a dial, $z$, graduated to indicate the number of step movements the said shaft has advanced. The said dial is provided with a stop or pin, 12, against which the pointer $y$ stops in its backward movement, caused by the weight $u$ when the pawls $e\ h$ are both disengaged from the wheel $f$, the said stop making a definite starting-point for the step-by-step movement in all the instruments in a circuit.

The disk $t$ is provided with a circuit-closing arm, $a^2$, of metal in connection with the frame and other metallic parts of the machine, and forming one electrode of the local circuit which may be connected with the binding-screw 2. The other terminal or electrode of the local circuit consists of a pin, $b$, carried by and insulated from the governor-arm $m$, and shaped at its lower end to fall into and engage one of the notches on the periphery of the disk $t$ which may happen to be under it; or, if it is desired to have the instrument give a signal, and the wheel $f$ and disk $t$ have been rotated the proper distance, the said pin $b^2$ will fall on the circuit-closing arm $a^2$ in one of the said notches and will close the local circuit, in which a vibrating bell or other suitable signal apparatus may be placed.

A tripping-pin, $c^2$, adjustably secured in the arm $m$, strikes and trips the retaining-pawl $h$ upon the descent of the said arm, and thus releases the ratchet-wheel $f$ and allows it to be turned back by the weight $w$ to its starting-point with the pointer $y$ against the pin 12.

It will be understood that the arm $m$ can fall to trip the pawl $h$ only when the lever $d$ is in its lowest position, and both pawls $e$ and $j$ disengaged from their respective wheels.

The downward movement of the lever $d$ is limited by the adjustable stop 15 in the arm $i^2$, (see Fig. 10,) and its upward movement by the stop 16, Fig. 3, it being guided by the pins $i\ i'$.

The signal controlling disk $t$ is provided with a retracting-weight, $d^2$, suspended from a pulley, $e^2$, having a tendency to rotate the said wheel to bring the pin 10 against the pin 11; but at the time the wheel $f$ is released and turned back by the weight $u$ the said wheel is engaged by the pin $b^2$ on the arm $m$, and is held thereby until at the next vibration of the lever $d$ the arm $m$ is raised and the said disk $t$ released and turned back by the weight $d^2$ until the pins 10 11 again engage, and the disk $t$ thereafter accompanies the ratchet-wheel $f$ in its further forward movement.

The circuit-closing arms $a^2$ are placed so as to arrive at a point under the closing-pin $b^2$ after a number of advance movements of the ratchet-wheel $f$, different in each instrument; and supposing the required number of such movements had been made to set the arm $a^2$ at that point in a given instrument, the arms $a^2$ in the other instrument would have passed or not yet reached the said point, and the closing-pins $b^2$ would fall in the notches in the insulating material of the wheel $t$.

If the wheel $f^2$ were made without the notches, it would be turned back with the wheel $f$ on the descent of the arm $m$, and all the arms $a^2$ that had passed beyond the point under the pin $b^2$ would be stopped by the latter in contact therewith, and would cause the signals to sound out of their proper time. The notches in the disk of any instrument may be dispensed with on that part of the disk which arrives in its rotation under the pin $b^2$ before the arm $a$.

The operation may be further described, as follows: Supposing it required seven movements to properly set an instrument it was desired to signal, the operator who wished to give the signal would depress the key 3 seven times and then leave it closed, the levers $d$ in the instrument being vibrated seven times, and then coming to rest against the stop 15. At the first vibration the pawl $j$ would rotate the disk $k$, and thereby raise the arm $m$ and tripping-pin $c^2$, leaving the retaining-pawl $h$ free to engage and hold the ratchet-wheel $f$, which had meantime been moved forward one tooth by the pawl $e$. At the end of the downward movement of the lever $d$ both pawls $e$ and $j$ are disengaged from the wheels $f$ and $k$, respectively, but the former is held by the pawl $h$, and the latter, in being turned by the weight of the arm $m$, revolves and is retarded by the fly $s$, so that the pin $c^2$ does not reach and trip the pawl $h$ before the next vibration of the lever $d$, in which the same operation is repeated, the arm $m$ being further raised and the wheel $f$ again advancing. As the lever $d$ continues vibrating the disk $k$ will be turned until the smooth part beyond the teeth comes under the pawl $j$, and the arm $m$ will be raised no farther, and after the seven vibrations the lever $d$ will come to rest on the stop 15 with the pawls $e$ and $j$ disengaged from the wheels $f$ and $k$ and the arm $m$ falls, rotating the fly $s$ and occupying a short interval of time, at the end of which the tripping-pin $c^2$ trips the pawl $h$, and the wheel $f$ turns back until stopped by the pointer $y$ engaging the pin 12. The circuit-closing pin $b^2$ at the same time falls upon the arm $a^2$ in the instrument to be signaled, and into the notches of the disks $t$ in the other instruments, thus closing the local circuit in the one and leaving the others unaffected.

The local circuit will remain closed until the instrument is again moved, which is usually done by the person receiving the signal, who depresses the key 3, thus vibrating the lever $d$ once, and at the same time raising the arm $m$, and thus lifting the pin $b^2$ from the notches in the disks $t$ and allowing them to fall back under the influence of the weights $d^2$, until stopped by the engagement of the pins 10 11. The arm $m$ will again fall and allow the wheel $f$ to return to its starting-point; but the pin $b^2$ will engage and hold the disk $t$ in the notch corresponding to the first movement of the wheels $f$. This will be the normal condition of the instruments, and this notch should not contain a circuit-closing arm, $a^2$, in any of the instruments.

It is obvious that the construction of the instruments may be modified in various ways without departing from our invention. The weights may be replaced by springs, the ratchet may be made as a toothed bar and have a rectilinear movement instead of rotary, the other parts being changed to correspond; or the disk $f$ or its equivalent may be made to mechanically control the operation of a bell-hammer instead of controlling a local circuit.

We claim—

1. In a telephone-signal apparatus, an electro-magnet and signal-controlling mechanism operated thereby with a step-by-step movement to set a signal-instrument in position to give a signal after a definite number of such step movements, and a governor for the said signal-controlling mechanism, operated by the same electro-magnet to permit it to advance while the consecutive step movements are made within certain definite intervals of time, and adapted to cause the said mechanism to be set back to its starting-point when a longer interval elapses after one of the said step movements, substantially as described.

2. In a signal-instrument, a ratchet and actuating and retaining pawls therefor, and a governing device adapted, when in its normal position, to hold the said retaining-pawl disengaged from the ratchet, and mechanism operated simultaneously with the actuating-pawl to cause the said governing mechanism to allow the retaining-pawl to engage the ratchet for a certain interval of time, during which the said governing mechanism is returning to its normal position to disengage the said retaining-pawl, substantially as described.

3. In a signal-instrument, a ratchet and actuating and retaining pawls therefor, combined with a governing device to operate the said retaining-pawl, and a retarding device for the said governing device to cause it to occupy a certain interval of time in coming into engagement with and operating the said retaining-pawl, substantially as described.

4. In a signal-instrument, a ratchet and electro-magnet and its armature to give it a step-by-step movement, and a signal-controlling device adapted to be moved positively with the said ratchet in its step-by-step movement, but to allow the latter to be moved back independently of the said disk, substantially as and for the purpose described.

5. The combination of a ratchet and signal-controlling device, a disk moved positively therewith in one direction, and an electro-magnet and its armature to give the said ratchet and controlling device a step-by-step movement, and a retaining-pawl therefor, and a retractor to return the said ratchet, when disengaged, to its starting-point, with a governing device adapted, after the step-by-step-movement has been completed, to engage and hold the signal-controlling device and at the same time to operate the retaining-pawl to release the ratchet and allow it to return to its starting-point, substantially as described.

6. In a signal-instrument, a ratchet and retractor therefor, and mechanism to give it a step-by-step forward movement, combined with a signal-controlling device adapted to be engaged at a certain point by and moved therefrom positively with the said ratchet, and an independent retractor for the said device, whereby, after the ratchet and controlling devices have been moved forward together, the ratchet may be released and moved back independently of the controlling device, and the latter, when released, will be moved back to its point of engagement with the said ratchet, substantially as described.

7. The combination, with the governing device and a pawl vibrated by an electro-magnet, of the disk connected with the governing device and provided with teeth on a portion of its periphery to be engaged by the said pawl, whereby the said pawl can move the said disk and connected governing device only a certain definite distance, the pawl thereafter vibrating over the portion of the disk not provided with teeth, as and for the purpose described.

8. The combination, with an electro-magnet, its armature and armature-lever, a ratchet-wheel, and connected signal-controlling mechanism and retaining-pawl therefor, and a toothed disk and connected governing mechanism, of actuating-pawls for the said ratchet-wheel and toothed disk, and stops to disengage the said pawls after they have completed their movement to actuate the said wheel and disk.

9. The toothed disk and connected governor-arm, combined with the retarding device and weight, movable along the said arm to adjust its effective pressure and thereby regulate the time occupied in its descent, substantially as described.

10. The ratchet and retaining-pawl and connected signal-controlling disk, notched at its periphery and provided with a circuit-closing arm, and the governor-arm provided with tripping and circuit-closing pins to simultaneously trip the retaining-pawl and engage a notch in or the circuit-closing arm on the said disk, substantially as described.

In testimony whereof we have signed our names to this specification in the presence of two subscribing witnesses.

FRANK CHENEY, JR.
SYLVESTER H. ROPER.

Witnesses:
JOS. P. LIVERMORE,
N. E. C. WHITNEY.